United States Patent
Farris

(10) Patent No.: US 8,151,738 B1
(45) Date of Patent: Apr. 10, 2012

(54) PET RESTRAINT APPARATUS

(76) Inventor: Kirsten Farris, Flower Mound, TX (US)

( * ) Notice: Subject to any disclaimer, the term of this patent is extended or adjusted under 35 U.S.C. 154(b) by 373 days.

(21) Appl. No.: 11/753,825

(22) Filed: May 25, 2007

(51) Int. Cl.
*A01K 1/06* (2006.01)
*A01K 27/00* (2006.01)
*A01K 3/00* (2006.01)

(52) U.S. Cl. ........................................ 119/814; 119/858

(58) Field of Classification Search .............. 119/769, 119/770, 792, 795, 814, 816, 856, 857, 858; 482/10; 70/16
See application file for complete search history.

(56) References Cited

U.S. PATENT DOCUMENTS

| | | | | |
|---|---|---|---|---|
| 795,960 | A * | 8/1905 | Cook | 473/424 |
| 2,043,410 | A * | 6/1936 | Huber | 119/816 |
| 2,790,418 | A * | 4/1957 | Boling | 119/816 |
| 3,140,871 | A * | 7/1964 | Liquori | 482/81 |
| 3,528,654 | A * | 9/1970 | Larson et al. | 482/81 |
| 3,590,783 | A * | 7/1971 | Purgett | 119/783 |
| 5,038,717 | A * | 8/1991 | Bent | 119/815 |
| 5,456,214 | A * | 10/1995 | Quilling | 119/795 |
| 5,591,089 | A * | 1/1997 | Huffines | 473/215 |
| 5,660,146 | A * | 8/1997 | Sporn | 119/792 |
| 5,681,225 | A * | 10/1997 | Cary | 473/229 |
| 6,368,241 | B1 * | 4/2002 | Abel | 473/508 |
| 6,435,137 | B1 * | 8/2002 | Hourihan | 119/788 |
| 6,745,722 | B1 * | 6/2004 | Quilling | 119/795 |
| 2006/0144344 | A1 * | 7/2006 | Stokes et al. | 119/858 |
| 2008/0245317 | A1 * | 10/2008 | Caldwell | 119/795 |
| 2008/0282994 | A1 * | 11/2008 | Martin | 119/795 |

FOREIGN PATENT DOCUMENTS

| | | | |
|---|---|---|---|
| SU | 1287800 | A * | 2/1987 |
| SU | 1743507 | A1 * | 6/1992 |

* cited by examiner

*Primary Examiner* — Rob Swiatek
*Assistant Examiner* — Danielle Clerkley
(74) *Attorney, Agent, or Firm* — Michael Diaz

(57) ABSTRACT

An apparatus for restraining a pet. The apparatus includes a sphere having a weighted center and a chain attached to the sphere and a collar worn by the pet. The chain allows the sphere to hang from the pet. Thus, the movement of the pet is restricted by the added weight of the sphere. Preferably, the sphere includes at least two bars affixed to an outer surface of the sphere. In addition, the chain preferably includes at least two chain extensions. Each extension of the chain is attached to each of the bar. In addition, the chain is of a sufficient length to allow the sphere to roll upon the ground. The sphere may be constructed of a rubberized material. In addition, the chain may be covered by a fabric material.

12 Claims, 5 Drawing Sheets

PET RESTRAINT APPARATUS

BACKGROUND OF THE INVENTION

1. Field of the Invention

This invention relates to pet devices. Specifically, and not by way of limitation, the present invention relates to an apparatus for restraining pets.

2. Description of the Related Art

In today's society, pets are an integral part of many households. In particular, many people consider dogs as members of the family. Because dogs enjoy being around their masters, dogs often reside within the interior of the home. Dogs possess a natural curiosity and often show intense interest in people entering a house. But oftentimes this intense interest shown by a dog is transformed into over-exuberance resulting in the dog jumping on the person entering the house. In other instances, puppies and young adult dogs have too much energy resulting in the dogs running around the house chasing both imaginary and real objects or persons and jumping on furniture or people.

Many existing devices and methods are utilized to attempt to restrain dogs. First, the dog may be tied to a post or immoveable object. However, tying the dog to the object for a long period of time can be inhumane. Other people lock the dog in a room or crate when guests arrive at a house. Placing the dog in the room or crate may be difficult to accomplish and it isolates the pet from the rest of the family not allowing them to enjoy the company and camaraderie of the dog. Thus, the camaraderie enjoyed with the dog is removed. A device is needed which restrains the dog from jumping up and over-exuberant running around, yet allows some mobility to the dog. In addition, it would be beneficial to have an apparatus which would allow the dog free choice of horizontal movement and does not require locking the dog in a closed area.

Thus, it would be advantageous to have an apparatus which limits the mobility of the dog and allows the dog to freely roam within an interior of a residence. It is an object of the present invention to provide such an apparatus.

SUMMARY OF THE INVENTION

In one aspect, the present invention is an apparatus for restraining a pet. The apparatus includes a sphere having a weighted center and a chain attached to the sphere and a collar worn by the pet. The chain allows the sphere to hang from the pet. Thus, the movement of the pet is restricted by the added weight of the sphere. Preferably, the sphere includes at least two bars affixed to an outer surface of the sphere. In addition, the chain preferably includes at least two chain extensions. Each extension of the chain is attached to each of the bar. In addition, the chain is of a sufficient length to allow the sphere to roll upon the ground. The sphere may be constructed of a rubberized material. In addition, the chain may be covered by a fabric material.

DESCRIPTION OF THE INVENTION

Figure 1:
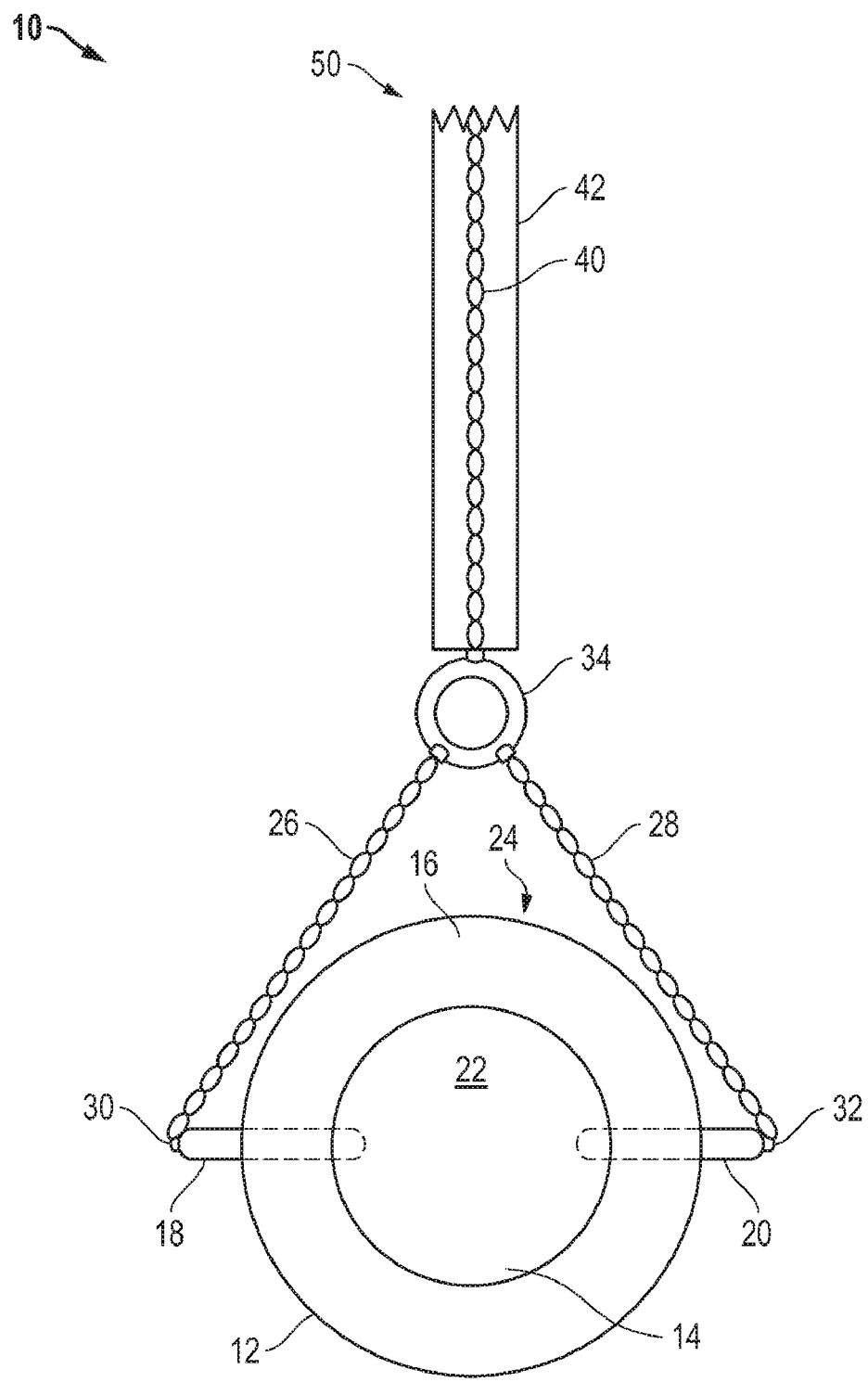
FIG. 1 is a front cutaway view of a pet restraint apparatus in the preferred embodiment of the present invention.

The present invention is a pet restraint apparatus. FIG. 1 is a front view of a pet restraint apparatus 10 in the preferred embodiment of the present invention. The pet restraint apparatus includes a sphere 12 having a weighted center 14. The sphere may be constructed of any resilient material. However, in the preferred embodiment of the present invention, the sphere is constructed of a rubberized outer section 16. The weighted center may be constructed of any material, however, to provide a dense mass, a heavy metal is preferably utilized. The sphere 12 preferably includes two bars 18 and 20 on opposing sides of the sphere. Each bar runs from an interior portion 22 through the outer section 16. Preferably, each bar extends beyond an outer surface 24 of the sphere. Chain segments 26 and 28 are attached to each bar 18 and 20. In the preferred embodiment of the present invention, the chain segments are attached in such a fashion as to allow the sphere to spin. Preferably the chain segments are attached to the bars and utilize ball bearings at attachment points 30 and 32 to facility the movement of the sphere.

The chain segments 26 and 28 are attached to a ring 34, thereby joining the chain segments at the ring 34. The ring may be constructed of any resilient substance, such as metal or a hard plastic. In addition, the chains may also be constructed of a resilient material, such as metal. The ring 34 is position above the sphere 12. Extending upwardly from the ring 34 is a main chain segment 40. In the preferred embodiment of the present invention, the chain is covered with a fabric wrap 42 to prevent chaffing to the pet wearing the pet restraint apparatus 10.

In the preferred embodiment of the present invention, the chain segments 26, 28, and 40 may be adjusted. For example, the chain segments may allow links of the chain to be removed. In an alternate embodiment of the present invention, the chain segments are constructed of a fabric, which may be adjusted by a buckle. It should be understood that the chain may be constructed of any material which allows the sphere to be suspended from the neck of the pet.

Figure 3:
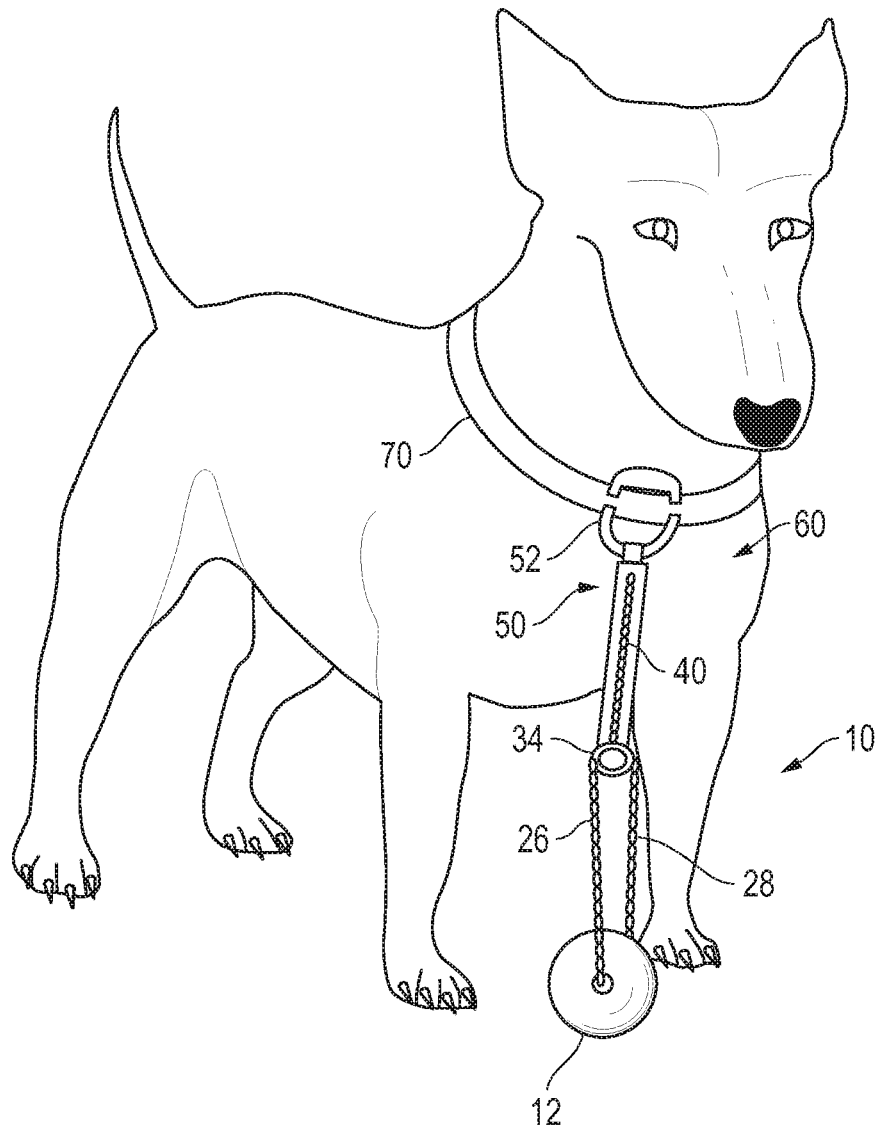
FIG. 3 is a front perspective view of the pet retrain apparatus attached to a dog in the preferred embodiment of the present invention.

On an upper portion 50 of the main chain segment 40 is an attachment mechanism 52 for attachment to a pet collar (see FIG. 3). The attachment mechanism may be any device allowing attachment of the main chain segment to the pet, such as a hook attached to the collar of the pet.

Figure 2:
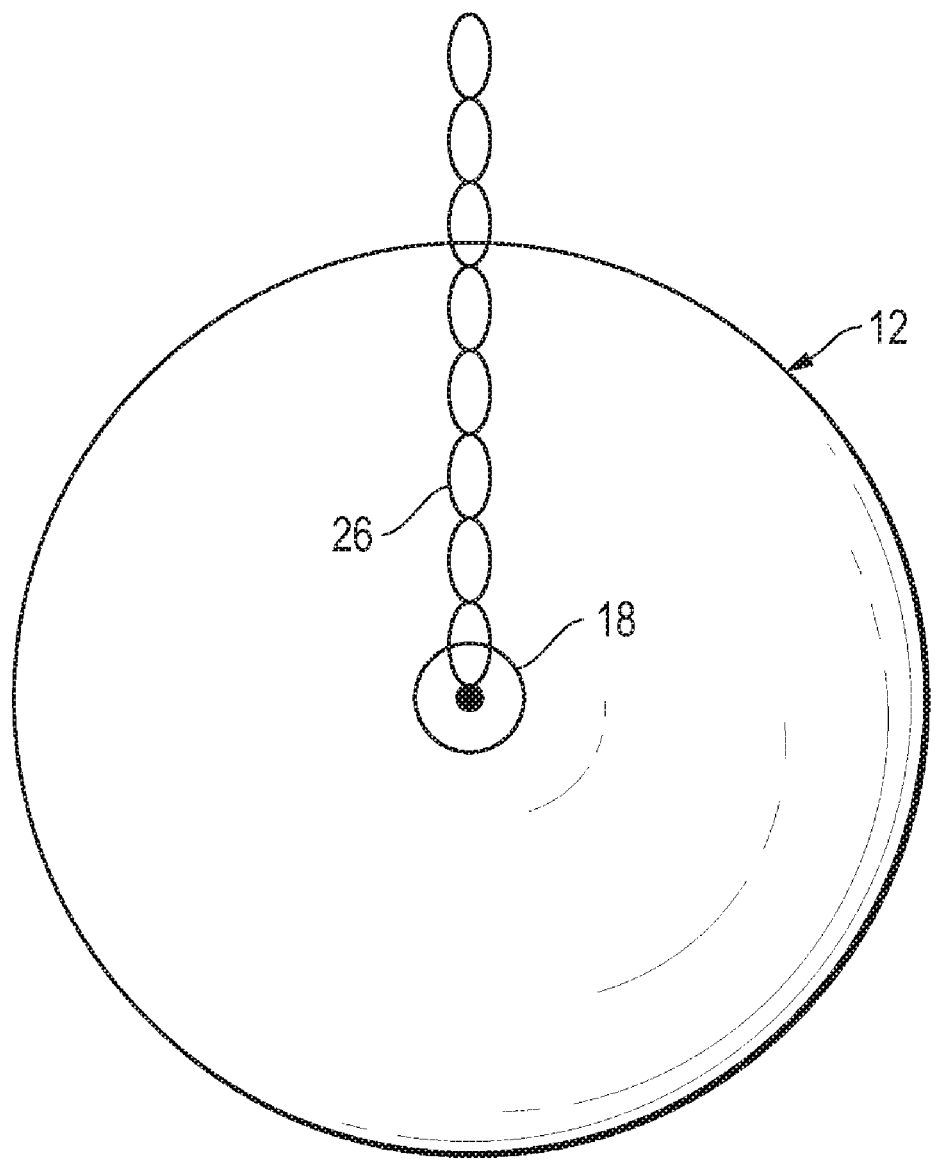
FIG. 2 is a side view of the sphere of FIG. 1.

FIG. 2 is a side view of the sphere 12 of FIG. 1. The chain segment 26 is attached to the bar 18. The chain segment is attached at the attachment point and preferably allows the sphere to roll or spin. It should be understood, that although chain segments positioned on opposing sides of the sphere are illustrated, that the sphere may be attached to the pet by any configuration. For example, the main chain segment may be attached directly to the sphere. In addition, although the shape of the sphere is preferably spherical, the sphere may be any shape, allowing containment of a weighted center. Preferably, the weighted center 14 is a highly concentrated metal deposit. However, any material adding weight to the sphere 12 may be utilized.

FIG. 3 is a front perspective view of the pet retrain apparatus 10 attached to a dog 60 in the preferred embodiment of the present invention. The main chain segment 40 is attached to the attachment mechanism 52. Preferably, the pet restraint apparatus is attached to a collar 70 worn by the dog 60. The length of the chain segments are preferably set at a length to allow the sphere 12 to rest upon the ground. However, in alternate embodiments of the present invention, the sphere may be positioned above the ground.

With reference to FIGS. 1-3, the operation of the pet restraint apparatus 10 will now be explained. To utilize the pet restraint apparatus 10, the main chain segment 40 is sized to allow the sphere to rest upon the ground. However, in an alternate embodiment of the present invention, the sphere is positioned and suspended above the ground. Once, the main chain segment is properly sized and the length of the main chain segment adjusted accordingly, the main chain segment is attached to the dog 60. Preferably, the attachment point 52 is attached to the collar 72 of the dog. The dog is then allowed to roam the premises. Because the sphere has the weighted center 14, the dog is constrained by the added weight of the sphere. Preferably, with the sphere resting upon the ground, the dog is able to drag the sphere upon the ground. Additionally, in the preferred embodiment of the present invention, the sphere is allowed to rotate upon the ground because the sphere is attached to the bars 18 and 20. Thus, the dog may roll the sphere upon the ground, thereby allowing free horizontal movement of the dog. However, movement of the sphere is somewhat restricted because of the added weight of the sphere. In particular, vertical movement of the dog is restricted by the added weight. Thus, although the dog is not completely immobilized by wearing the pet restraint apparatus 10, the dog must still exert additional effort to move. This restricted movement allows total mobility of the dog, yet requires additional effort from the dog, thereby constraining, pacifying, and calming the dog. In addition, the outer surface is constructed of a rubberized material allowing the dog to chew or bite the sphere, providing an additional function of a chewable toy for the dog. The rubber coating also prevents the apparatus from scratching or marking indoor surfaces (e.g., floor, furniture etc.). The pet restraint apparatus 10 may be removed as desired by the user.

Figure 4:
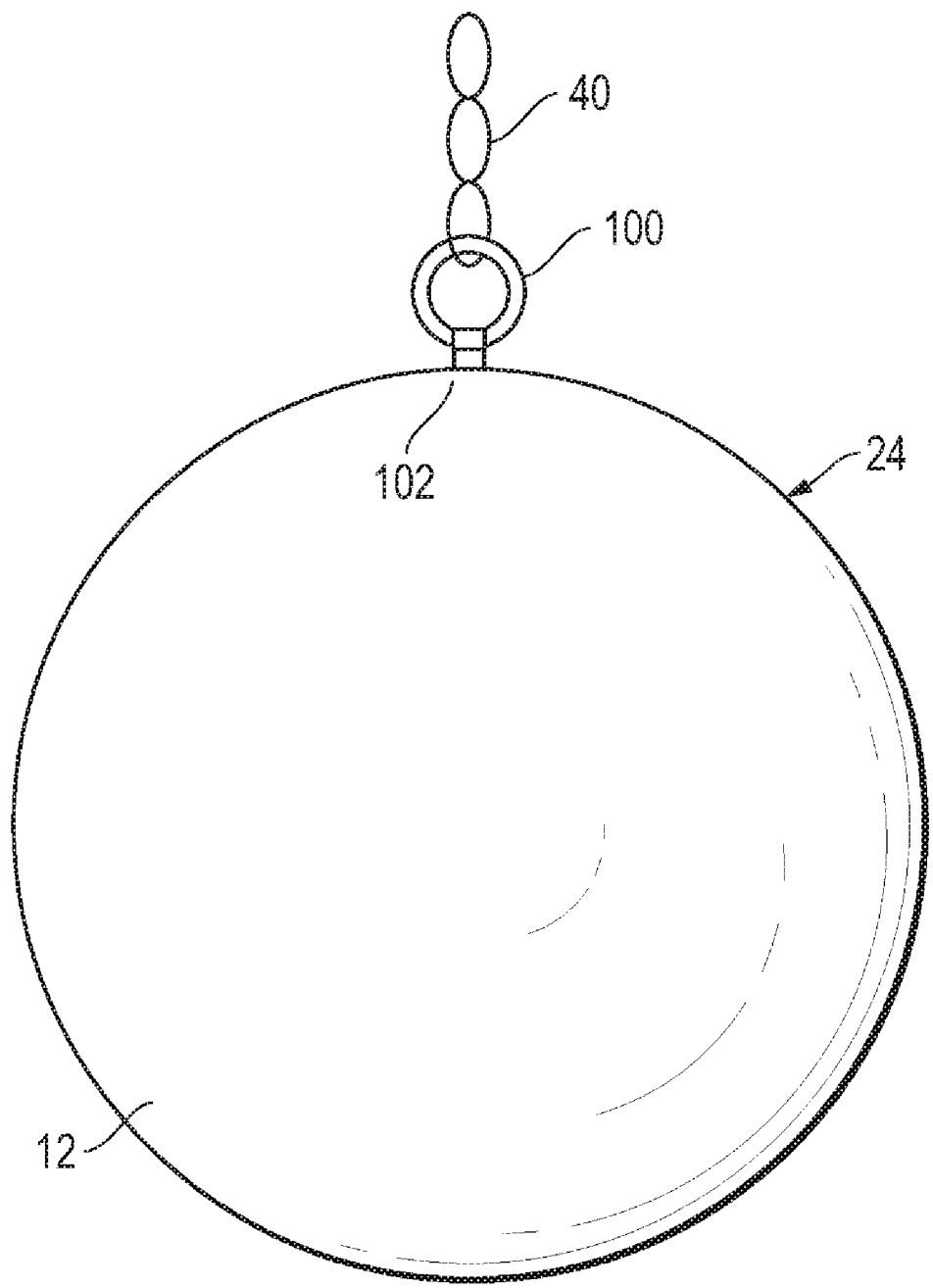
FIG. 4 is a side view of the sphere in a first alternate embodiment of the present invention.

FIG. 4 is a side view of the sphere 12 in a first alternate embodiment of the present invention. The main chain segment 40 may be attached directly to the sphere 12. In this alternate embodiment of the present invention, the main chain segment may be attached to an attachment mechanism 100 affixed to the outer surface 24 of the sphere at an attachment point 102. The sphere does not rotate in this configuration.

Figure 5:
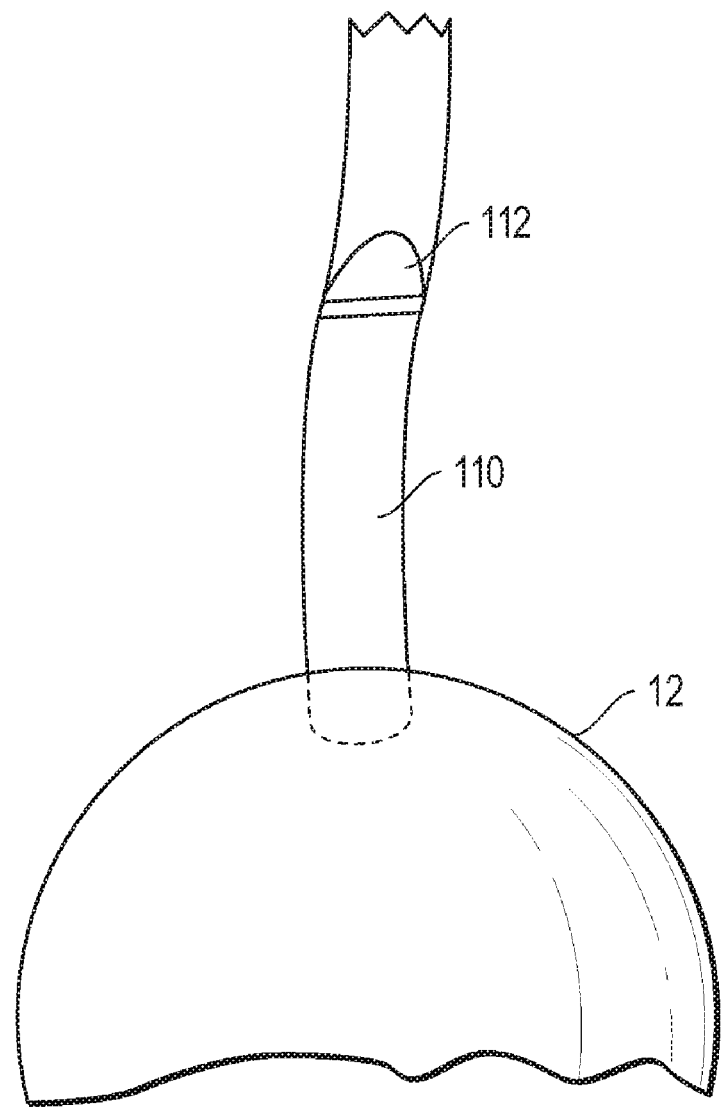
FIG. 5 is a side view of the sphere attached to a fabric strap in a second alternate embodiment of the present invention.

FIG. 5 is a side view of the sphere 12 attached to a fabric strap 110 in a second alternate embodiment of the present invention. The strap may be constructed of any fabric material and attached directly to the sphere. In addition, to allow adjustment of the strap 110, a buckle 112 may be utilized to change the length of the strap. The strap may be attached directly to the sphere or to bars affixed to the sphere.

The sphere may be constructed of any size to accommodate a dog of any size. Obviously, the weight and size of the sphere must be bigger for larger dogs, such as Great Danes and smaller for smaller dogs, such as poodles. In addition, although a sphere is utilized in the preferred embodiment, any object of any shape may be utilized which provides added weight to the pet restraint apparatus. In addition, the pet restraint apparatus 10 may be utilized for any animal and is not limited to use for a dog.

The present invention provides many advantages over existing pet restraint devices. The present invention allows the pet to move within a specified location while still restricting the movement of the pet. In addition, the pet restraint apparatus may be utilized by any size pet. The present invention may also perform the additional function of being a chewable toy for the pet.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A pet restraint apparatus for restraining a pet, the pet restraint apparatus comprising:
    a restraint object having a weighted center;
    an attachment means for attaching the object to the pet; and
    the object is spherical and includes at least two bars affixed to the object providing a pivot point for the sphere to roll on the ground; and
    the attachment means includes at least two chain extensions, each extension being attached to each bar;
    whereby the vertical movement of the pet is restricted by the added weight of the object and the pet restraint apparatus allows free horizontal movement of the pet.

2. The pet restraint apparatus for restraining a pet of claim 1 wherein the restraint object is constructed of a rubber material.

3. The pet restraint apparatus for restraining a pet of claim 1 wherein the restraint object is constructed of a chewable material.

4. The pet restraint apparatus for restraining a pet of claim 1 wherein the weighted center is constructed of a dense metallic material.

5. The pet restraint apparatus for restraining a pet of claim 1 wherein the attachment means is a chain attached to the chain extensions, the chain having a length allowing the object to suspend from the pet.

6. The pet restraint apparatus for restraining a pet of claim 5 wherein the length of the chain is sufficient to allow the object to rest upon the ground when the pet restraint apparatus is worn by the pet.

7. The pet restraint apparatus for restrain a pet of claim 5 wherein the length of the chain allows the object to be suspended above the ground when the pet restraint apparatus is worn by the pet.

8. The pet restraint apparatus for restraining a pet of claim 5 wherein the chain is covered with a fabric material.

9. The pet restraint apparatus for restraining a pet for claim 5 wherein the length of the chain is adjustable.

10. The pet restraint apparatus for restraining a pet of claim 5 wherein the chain is attached to a collar worn by the pet.

11. A pet restraint apparatus for restraining a pet the pet restraint apparatus comprising:
    a sphere having a weighted center;
    a chain having a specified length, the chain attached to the sphere and the pet;
    the length of the chain is sufficient to allow the sphere to rest upon the ground when the pet restraint apparatus is worn by the pet;
    wherein the chain allows the sphere to hang from the pet;
    the sphere includes at least two bars affixed the sphere providing a pivot point for the sphere to roll on the ground; and
    the chain includes at least two chain extensions, each extension attached to each bar;
    whereby the movement of the pet is restricted by the added weight of the sphere.

12. The pet restraint apparatus for restraining a pet of claim 11 wherein the sphere is constructed of a chewable material.

* * * * *